United States Patent
Edwards

(10) Patent No.: US 7,628,288 B2
(45) Date of Patent: Dec. 8, 2009

(54) RESILIENT AND DEFORMABLE CONTAINER LID

(75) Inventor: Brian Edwards, Oakham (GB)

(73) Assignee: RPC Containers Ltd., Oakham (GB)

( * ) Notice: Subject to any disclaimer, the term of this patent is extended or adjusted under 35 U.S.C. 154(b) by 801 days.

(21) Appl. No.: 10/815,324

(22) Filed: Mar. 31, 2004

(65) Prior Publication Data

US 2004/0262309 A1     Dec. 30, 2004

(51) Int. Cl.
*B65D 53/00* (2006.01)
*B65D 43/04* (2006.01)

(52) U.S. Cl. .................. 220/233; 220/281; 220/801

(58) Field of Classification Search .............. 220/233, 220/281, 801, 234, 239, 238, 232, 789, 804; 138/90, 89; 264/260, 261, 268, 328.12; 215/296, 215/298

See application file for complete search history.

(56) References Cited

U.S. PATENT DOCUMENTS

| | | | |
|---|---|---|---|
| 905,652 A | 12/1908 | Comings | |
| 2,671,574 A | 3/1954 | Wolfe | |
| 2,801,021 A * | 7/1957 | Wood | 220/233 |
| 3,048,297 A | 8/1962 | Elliott et al. | |
| 3,131,825 A * | 5/1964 | Sarafinas | 220/234 |
| 3,244,308 A * | 4/1966 | Esposito, Jr. | 215/270 |
| 3,640,422 A * | 2/1972 | Harschel | 220/233 |
| 4,303,171 A * | 12/1981 | Schremmer | 220/238 |
| 4,358,024 A * | 11/1982 | Underwood | 220/234 |
| 4,413,748 A | 11/1983 | Kessler et al. | |
| 4,968,197 A * | 11/1990 | Chen | 411/34 |
| 5,447,674 A * | 9/1995 | Schellenbach | 264/255 |
| 6,845,876 B2 * | 1/2005 | Helms, Jr. | 220/234 |

FOREIGN PATENT DOCUMENTS

| | | |
|---|---|---|
| DE | 42 06 244 A1 * | 9/1993 |
| EP | 0378866 A1 | 7/1990 |
| GB | 1009206 | 11/1965 |
| GB | 1152096 A | 5/1969 |
| GB | 1202122 A | 8/1970 |
| GB | 2017064 A | 10/1979 |
| GB | 2392906 | 3/2003 |
| JP | 2002274550 A | 9/2002 |
| WO | WO 03/011697 A1 | 2/2003 |

* cited by examiner

*Primary Examiner*—Robin Hylton
(74) *Attorney, Agent, or Firm*—Knobbe, Martens, Olson & Bear, LLP.

(57) ABSTRACT

A lid for a container comprises a groove for engagement with a rim of the container. The dimensions of the lid may be reduced sufficiently that the groove can be disengaged from the rim of the container without the use of a tool. An elastomeric section is moulded between two polypropylene sections such that when the recesses are squeezed together, the elastomeric section deforms and thereby allows a sufficient reduction in the diameter of the lid that the lid can be removed from the container without the use of a tool. A catch may be provided across the elastomeric section such that when the catch is in the closed position, the elastomeric section is prevented from deforming and the lid cannot be easily removed from the container.

18 Claims, 4 Drawing Sheets

RESILIENT AND DEFORMABLE CONTAINER LID

CLAIM OF PRIORITY

This U.S. patent application claims priority to Great Britain Patent Application No. GB 0307433.3 filed Mar. 31, 2003, which is hereby incorporated by reference herein in its entirety.

BACKGROUND OF THE INVENTION

1. Field of the Invention

The present invention relates to a lid for a container, and in particular to an easily removable lid and a method for manufacturing such a lid.

2. Description of the Related Art

Lids for containers such as paint pots have to be fitted tightly to the containers to avoid leakage of the contents and to reduce the chance of the lid detaching from the container in the event of deformation (e.g. as a result of being dropped). However, if the lids are fitted too tightly they become difficult to remove.

Containers such as paint cans are traditionally made from metal (typically steel) and are fitted with metal lids. The lids are generally planar with a downwardly projecting circumferential portion for engagement with a can. That projecting portion forms an interference fit within the rim of the can. Once fitted, the diameter of the lid above the rim and the diameter of the lid below the rim are greater than that of the aperture provided by the rim. Thus, to secure the lid and ensure a good seal between the container and the lid, force is required to insert or remove the lid. As a result, removal of the lid generally requires the use of a levering tool such as a screwdriver to be inserted between the container and a flange on the lid and prying the two apart.

As an alternative to the metal can, paint containers have recently also been made from plastic. If desired, the containers can be made from transparent plastic so that consumers can see the contents of the container. The lids of these containers are also made from plastic. Unlike the metal lids, they are provided with a groove that engages with a projection inside the rim of the container. However, they are removed in a similar manner to the metal lids. A tool is used to prise the lid from the container, the projection being deformed and forced from the groove as the lid is removed.

It will be appreciated that with such lids a compromise is necessary between making the lid fit tightly and being able to remove it with the aid of a tool such as a screwdriver. This means that the lid may not be secured as well as would be ideal with a consequent risk of spillage of paint. In addition, the need to use a tool to remove the lid is disadvantageous.

Screw top lids would not have these disadvantages, but they have been found to be unsuitable for containers for paint because the threads become clogged with paint and the lids are then very difficult to remove.

Lids may be provided with a seal around the edge to prevent leakage of the contents of the container. The seal may be made from rubber or other suitable flexible polymers. When a tool is used to remove the lid from the container, this seal frequently gets damaged. This can be a problem when the container needs to be opened after it has been filled in the factory and before it is sold to the end user. This is necessary when, for example, the user wants paint mixed to a certain colour. In this process, a container of neutral paint is opened, tinter is added, the lid is replaced and the container is then vibrated to mix the paint. It will be appreciated that, if the rubber seal is damaged in this process, the risk of the contents leaking is greatly increased.

SUMMARY OF THE INVENTION

According to a first aspect of the invention, there is provided a lid for a container wherein the perimeter of the lid is adapted to engage with an opening of the container and wherein the length of the perimeter of the lid may be reduced by a user to enable the lid to be disengaged from the container without the use of a tool.

Thus, instead of having to use a tool to prise the lid from a container, the user is able to reduce the perimeter of the lid so it can readily be removed. Preferably this is achieved by the lid having a body comprising a resiliently deformable portion which when deformed reduces the length of the perimeter of the lid.

Although the lid may take a variety of forms, for example it could be domed or otherwise stand proud of the container, it is desirable for it to be of a similar form to conventional lids. Thus, preferably, the body of the lid has a generally planar surface and the resiliently deformable portion forms part of that surface. A container with such a lid may easily be stacked and transported.

In order to deform the resiliently deformable portion of the lid, it may be necessary to exert significant pressure and so preferably this is facilitated by the provision of finger grips arranged to enable a user to deform the resiliently deformable portion.

In order to reduce the force required to deform the resiliently deformable portion, the resiliently deformable portion is preferably provided with an indentation at the periphery of the lid which directs the deformation of the resiliently deformable portion radially inwardly when the finger grips are squeezed together.

Although the deformable portion could be formed separately from the remainder of the lid and be bonded thereto, preferably the resiliently deformable portion is integrally formed with the remainder of the lid by bi-injection molding. In this process the major part of the lid is injection moulded from a first material and then the resilient portion is injection moulded from a second (resilient) material such that it bonds with the first material. This enables the lid of the invention to be produced rapidly and economically, whilst at the same time ensuring the integrity of the lid.

In order to facilitate this method of production, the lid is preferably formed of plastics. The lid is preferably formed from polypropylene. The resiliently deformable portion is preferably formed from an elastomeric material, for example a thermoplastic rubber such as EDPM (Ethylene Propylene Diene Monomer).

Although in many applications the resilience of the lid will secure it sufficiently to the container, preferably the lid further comprises a locking member arranged selectively to prevent disengagement of the lid. Such a locking member is particularly useful in the context of paint containers where spillage during transport is a particular problem to users.

The locking member may take a variety of forms. It could be a clip or other secondary device for holding the lid to the container, but preferably it comprises a catch which when engaged prevents said resiliently deformable portion from deforming. Thus, the length of the perimeter is not reduced and so the lid remains secured to the container. Particularly in the case of a large lid, a plurality of such catches may be provided. More preferably, the (or each) catch when engaged applies a biasing force to said resiliently deformable portion so as to oppose said deformation. This may be arranged to expand the deformable portion so as to more securely engage the lid to the container.

Although the catch may be a discrete component, it is preferably integrally formed with the lid, for example it may be integrally moulded. Preferably, the catch is hinged to the lid and when engaged lies substantially flush thereto. Such lids may easily be stacked and can be handled by machinery designed for conventional lids.

Lids of the present invention are particularly useful with containers having a diameter between 100 and 250 mm. Thus, in the preferred embodiments of the invention, the diameter of the lid is less than 250 mm. However, in principle, the invention is applicable to any size of lid.

Although in some applications the lid could be configured to form an interference fit within the container, preferably the lid is formed to co-operate with mating portions of the container. For example, the lid may further comprise a groove formed in the perimeter for engagement with a corresponding projection provided around the opening of the container. It is particularly preferred for the lid to be configured to engage with a standard plastics paint container. Indeed, it is particularly preferred that when the catch is in the locked position, the outer dimensions of the lid are similar to those of a conventional plastics lid so that the lid can be applied to a container in that configuration as if it were a standard lid. Thus, the lid can be supplied to existing production lines without their needing modification.

In some applications it may be desirable to provide an improved seal and so in such circumstances the lid further comprises a resilient seal around the perimeter. This is particularly advantageous when a container is to be repeatedly re-sealed. The resilient seal is preferably formed of the same material as the resiliently deformable portion and may be moulded integrally therewith. One way to achieve this is for the seal to be formed by elastomeric material that is connected via a plurality of flow paths through the body to an injection point.

This approach to providing a seal is believed to be independently inventive and so viewed from another aspect the invention provides a lid for a container comprising a body and a peripheral elastomeric seal, wherein the seal and body are moulded together by bi-injection moulding, the seal being formed by elastomeric material that is connected via a plurality of flow paths through the body to an injection point.

Where this approach is applied to provide a seal on a conventional lid, the injection point is preferably located generally centrally on the lid and the flow paths radiate outwardly therefrom. However, it is preferably applied to a lid with a deformable portion and in this case the elastomeric deformable seal and the deformable portion are preferably integrally moulded and are connected by the flow paths.

In order to retain the lid even more securely, a plurality of additional lateral projections such as latches, retaining bead extensions etc. may be integrally moulded around the perimeter at suitable locations, such that they engage with the rim and assist in securing the lid to the container.

It will be appreciated that the invention also extends to a lid as previously described in combination with a corresponding container the lid being engaged with the container so as to provide a sealed vessel. The vessel is preferably of the type for holding paint, varnish, wood preservatives or the like. However, it may be used in numerous other applications, for example to hold food products such as preserves.

The invention also extends to methods of making such lids. Thus, viewed from another aspect the invention provides a method of forming a lid for a container wherein the lid comprises a deformable portion which when deformed reduces the perimeter of the lid so as to facilitate removal of the lid from a container, the method comprising: moulding the major portion of the lid in a first mould; transferring the major portion to a second mould; and in the second mould, moulding the deformable portion from elastomeric material such that the elastomeric material bonds with the major portion.

Likewise, viewed from a still further aspect the invention provides a method of forming a lid for a container, the lid comprising a body and a peripheral elastomeric seal, the method comprising forming the seal and body by bi-injection moulding, the seal being formed by elastomeric material that flows via a plurality of flow paths through the body from an injection point.

The above methods are preferably used to produce containers having the preferred features previously described.

BRIEF DESCRIPTION OF THE DRAWINGS

An embodiment of the invention will now be described by way of example only and with reference to the accompanying drawings in which.

DETAILED DESCRIPTION OF THE PREFERRED EMBODIMENT

Figure 9:
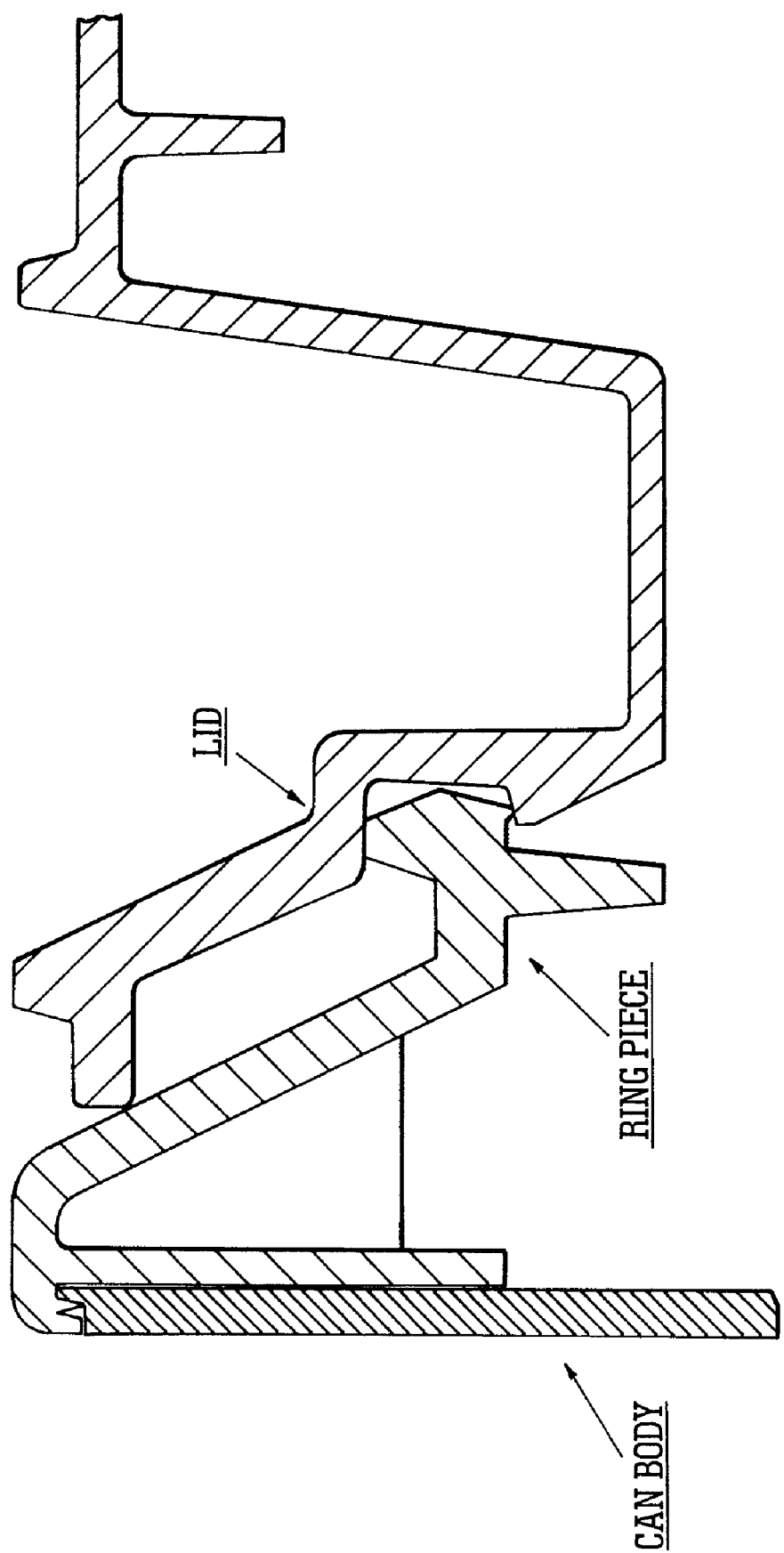
FIG. 9 is a cross-section showing the engagement of a known lid and a known container.

Turning first to FIG. 9, this shows a cross section through a plastic lid and container of the conventional construction. A container 1 includes a ring piece 2 attached to the container body which is provided with a rim 3 for engagement with a groove 5 of the lid 4. To remove the lid 4 from the container 1, a tool such as a screwdriver must be inserted into the gap 6 between the lid 4 and the ring piece 2 and used as a lever to deform the lid 4 and the ring piece 2 until the groove 5 disengages from the rim 3. The lid 4 can then be removed and the contents of the container 1 accessed.

FIGS. 1 to 4 show a lid 4 according to an embodiment of the present invention. This lid can be fitted to containers of known construction such as the one shown in FIG. 9.

The lid 4 is circular and generally planar in construction and is divided into three sections. The outer sections 7, 8 are made of polypropylene. Sections 7 and 8 are parts of a single piece of polypropylene. The central section 12 is made of a thermoplastic rubber such as EDPM. These three sections are formed together by bi-injection moulding as will be described more fully below. The elastomeric section 12 is generally triangular in shape, extending along the diameter of the lid 4.

The lid 4 is formed with two recesses 9, 10; one recess is either side of the elastomeric section 12 at the wide end of the triangle. These provide for finger grips 9a, 10a.

A catch 11 is integrally moulded such that it is hinged at 11a to one of the polypropylene sections 7 of the lid 4. The catch 11 is shown folded down in the locked position so that it extends across the elastomeric section 12 of the lid 4. A socket 14 for receiving a protrusion 13 formed at the end of catch 11 is provided in the other polypropylene section 8.

As may be seen from FIGS. 3 and 5 to 7, the shape of the perimeter of the lid is similar to that of a conventional lid. Thus, it has a groove 5 for receiving the projecting rim of the container.

The lid 4 is also provided with an o-ring or a seal 15 below the groove 5 such that when the lid is in place, the seal is in contact with the rim 3 of the container 1.

Figure 1:
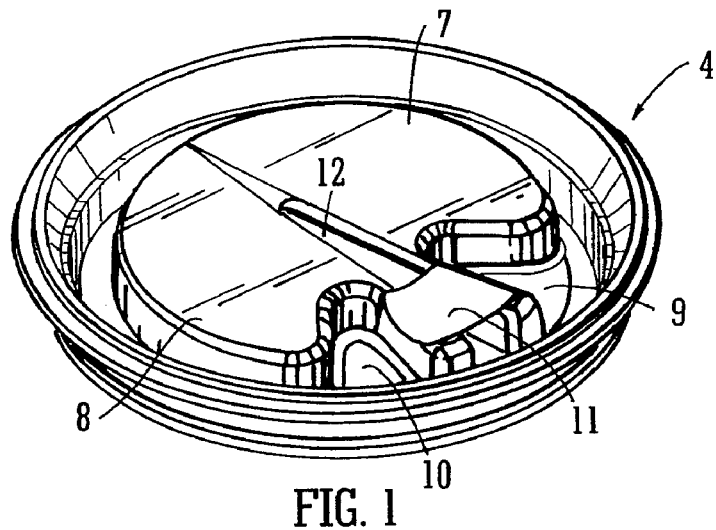
FIG. 1 is an isometric view of an embodiment of the present invention.
Figure 2:
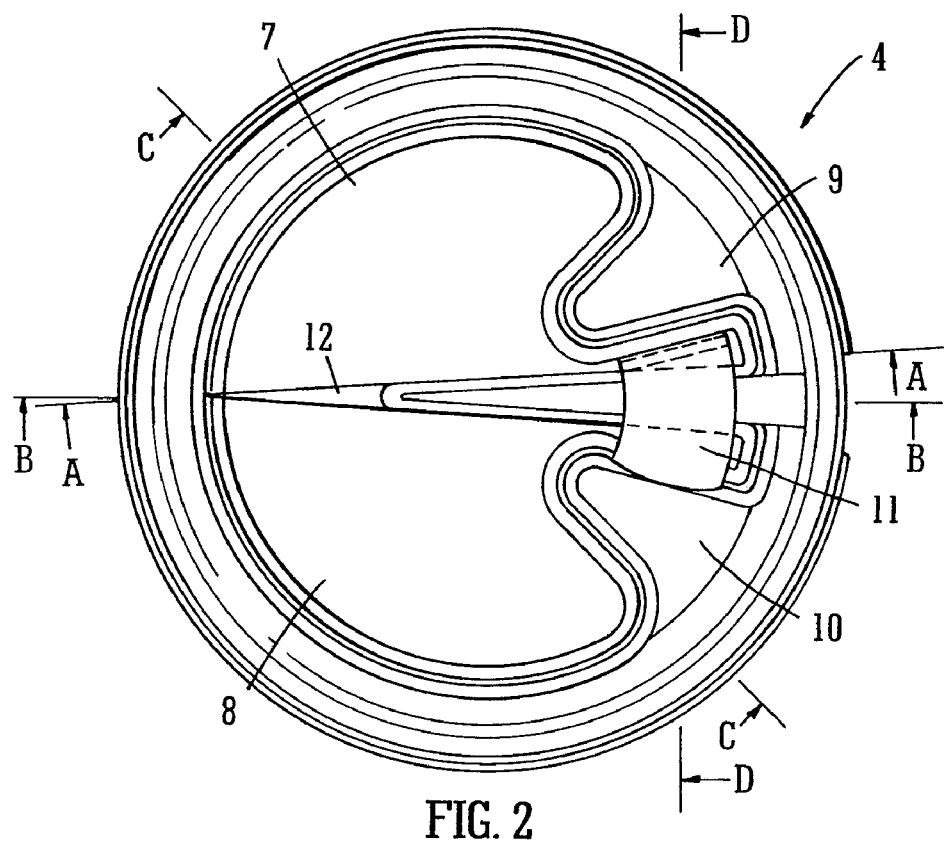
FIG. 2 is a top view of the lid of FIG. 1.
Figure 3:
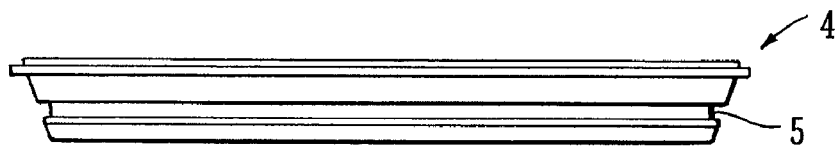
FIG. 3 is a side view of the lid of FIG. 1.
Figure 4:
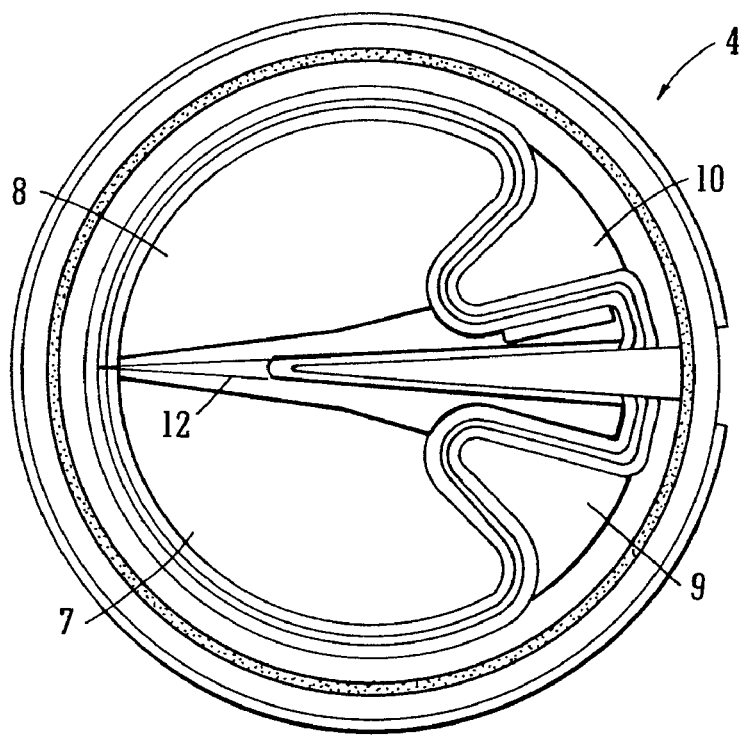
FIG. 4 is a bottom view of the lid of FIG. 1.
Figure 5:
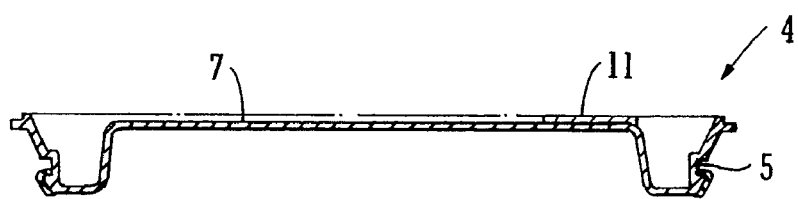
FIG. 5 is a section through the line A-A of FIG. 2.
Figure 6:
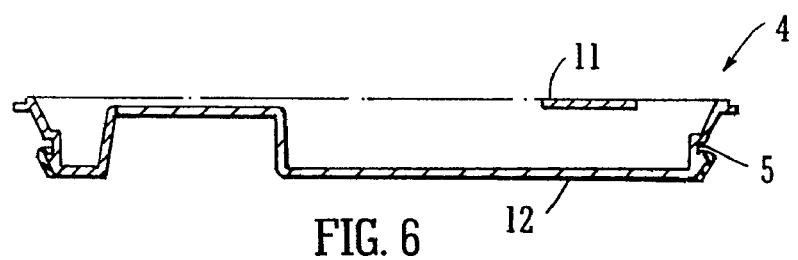
FIG. 6 is a section through the line B-B of FIG. 2.
Figure 7:
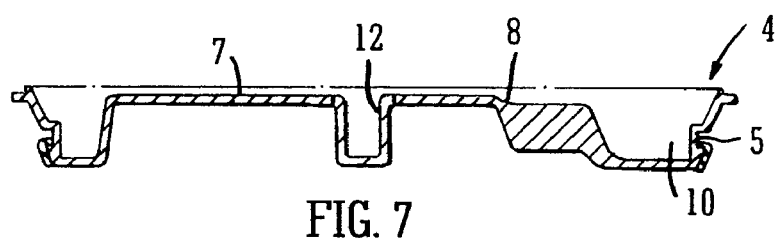
FIG. 7 is a section through the line C-C of FIG. 2.
Figure 8:
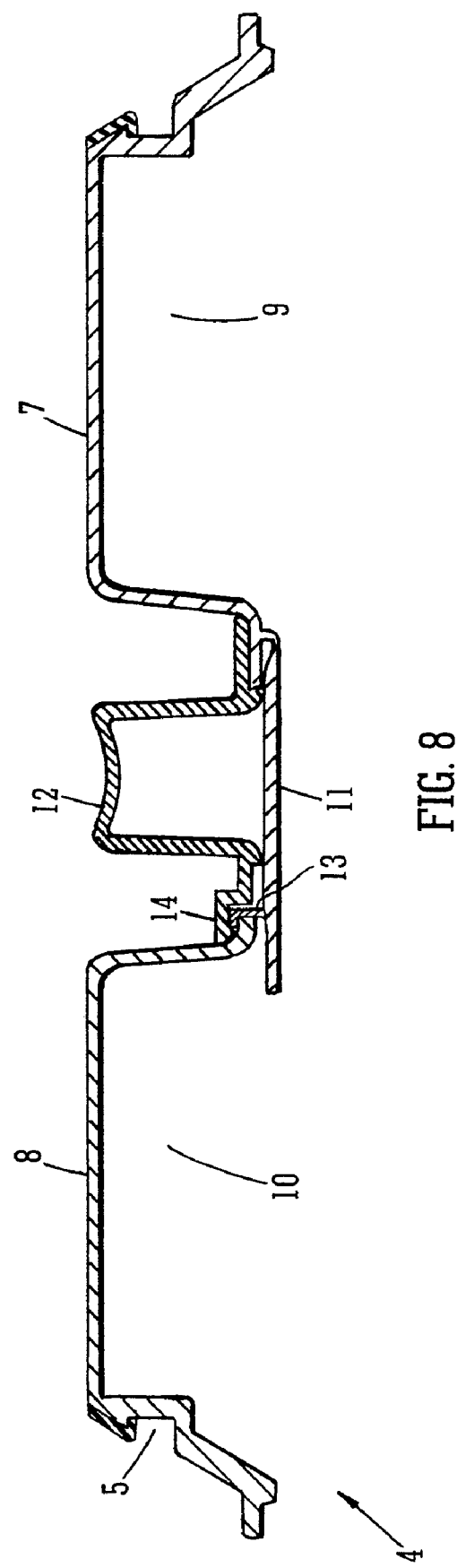
FIG. 8 is a section through the line D-D of FIG. 2.

When the lid is fitted to a container, the contents of the container are thus sealed within the container below the seal 15. In this configuration, protrusion 13 of the catch 11 is inserted into the socket 14 where it forms an interference fit, as shown in FIG. 8. Thus, it will not accidentally disengage from the socket 14, but rather will require a small force for disengagement such as can be easily provided by hand without the aid of a tool.

The catch 11 is dimensioned such that, in this closed position, it provides a small force biasing the polypropylene sections apart. Thus it prevents the elastomeric section 12 from being compressed and actually stretches it slightly. Thus, the lid 4 remains firmly engaged with the container 1 and the container 1 is protected against accidental opening.

To open the container 1, the catch 11 is raised to the open position and the finger grips 9a, 10a are squeezed together to compress the elastomeric portion 12 of the lid 4. This causes sufficient reduction in the diameter of the lid 4 to allow the groove 5 to disengage from the rim 3 of the container 1. The lid 4 can then be removed from the container 1 without the aid of a tool.

Because the lid 4 is substantially the same shape as typical lids currently in use, it can be fitted to a container 1 in the filling plant without significantly altering the production line equipment. Currently, after containers have been filled, lids are fitted to them by passing them under a roller which forces them into place. Lids 4 according to the present invention are provided to the production line with the catches in the closed position and are fitted to the containers in exactly the same way.

The lid 4 is manufactured by a two stage bi-injection moulding process. In the first stage, a mould for shaping the sections 7, 8 of the lid 4 is injected with molten polypropylene. Once it has cooled, the product of this mould is then transferred to a second mould having the shape of the desired end product (i.e. of all three sections 7, 8 and 12). The empty section of this cast is then injected with molten elastomeric material. Where the hot elastomeric material contacts the polypropylene, the polypropylene melts and the two materials bond together to form an integral lid.

The seal 15 is formed as part of the second moulding stage. This is done by means of channels (not shown) formed in the underside of the polypropylene sections that allow the elastomeric material to flow from the resilient portion to the seal. This results in thin lines of elastomer on the underside of the completed lid, but these are only visible when the lid is removed from the container.

The lid is moulded with the catch in the open position. When the lid has cooled, it is folded down into the closed position (see FIG. 8). The lid may then be stacked and transported to a container filling line.

What is claimed is:

1. A lid for a container, the lid comprising:
   a body portion with a generally planar surface and a downwardly projecting perimeter portion having a length;
   the body portion comprising a resiliently deformable portion located between two portions having greater rigidity than the resiliently deformable portion; wherein the two portions are not biased apart by the resiliently deformable portion when the resiliently deformable portion is not deformed and wherein the two portions are biased apart when the resiliently deformable portion is deformed, such that when the resiliently deformable portion is deformed, the length of the perimeter of the lid is reduced so as to enable the lid to be disengaged from the container without the use of a tool and the perimeter portion comprising a groove for engagement with a corresponding projection provided around the opening of the container.

2. A lid as claimed in claim 1, further comprising recesses either side of the resiliently deformable portion to form finger grips to enable a user to deform the resiliently deformable portion.

3. A lid as claimed in claim 1, wherein said resiliently deformable portion is integrally formed with the remainder of the lid by bi-injection molding.

4. A lid as claimed in claim 1, further comprising a locking member which, in the locked position, extends across the resiliently deformable portion and is arranged in the locked position to prevent disengagement of the lid.

5. A lid as claimed in claim 4, wherein the locking member comprises a catch which when engaged with the lid prevents said resiliently deformable portion from deforming.

6. A lid as claimed in claim 5, wherein the catch when engaged applies a biasing force to said resiliently deformable portion so as to oppose said deformation.

7. A lid as claimed in claim 5, wherein the catch is integrally formed with said lid.

8. A lid as claimed in claim 1, wherein the body portion comprises polypropylene.

9. A lid as claimed in claim 1, wherein the resiliently deformable portion is formed from an elastomeric material.

10. A lid as claimed in claim 1, wherein the diameter of the lid is less than 250 mm.

11. A lid as claimed in claim 1, further comprising a resilient seal around the perimeter.

12. A lid as claimed in claim 11, wherein the resilient seal is formed of the same material as the resiliently deformable portion and is moulded integrally therewith.

13. A lid as claimed in claim 5, wherein the lid defines an uppermost surface and the catch is hinged to the lid and when engaged lies substantially flush to the uppermost surface of the lid.

14. A lid as claimed in claim 5, which is adapted to be engaged with the opening of a container with the catch engaged.

15. A lid as claimed in claim 1, further comprising a plurality of lateral projections provided on the perimeter to assist in securing the lid to a container.

16. A lid as claimed in claim 1, further comprising at least one indentation in the resiliently deformable portion on the perimeter portion of the lid so as to direct the resiliently deformable portion radially inward when deformed.

17. A lid as claimed in claim 1, wherein the lid is coupled to a corresponding container, the lid being engaged with the container so as to provide a sealed vessel.

18. A lid as claimed in claim 17, wherein the lid and container are adapted for holding paint, varnish, or wood preservatives.

* * * * *

UNITED STATES PATENT AND TRADEMARK OFFICE
CERTIFICATE OF CORRECTION

PATENT NO. : 7,628,288 B2  Page 1 of 1
APPLICATION NO. : 10/815324
DATED : December 8, 2009
INVENTOR(S) : Brian Edwards It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1159 days.

Signed and Sealed this

Twenty-first Day of December, 2010

David J. Kappos
*Director of the United States Patent and Trademark Office*